Patented June 15, 1948

2,443,245

UNITED STATES PATENT OFFICE 2,443,245

ISOBUTYLENE PURIFICATION

Henry J. Hibshman, Plainfield, N. J., assignor to Standard Oil Development Company, a corporation of Delaware No Drawing. Application August 24, 1946, Serial No. 692,933

10 Claims. (Cl. 260—677)

This invention relates to improvements in the separation and recovery of olefins from mixtures of olefins and saturated hydrocarbons which are associated in gaseous and liquid hydrocarbon mixtures, and, more particularly, to the separation of tertiary olefins having four to five carbon atoms to the molecule from mixtures of hydrocarbons or mixtures consisting mainly of olefins and saturated hydrocarbons.

The separation of olefins by fractional distillation from saturated hydrocarbons having the same number of carbon atoms to the molecule, as in the case of mixtures produced by cracking or pyrolysis of petroleum oils or other bituminous materials, is very difficult. In most cases, it is impossible for all practical purposes, for example, to fractionally separate by distillation propylene boiling at $-48.2°$ C. from propane which boils at $-45°$ C. The separation of four-carbon-atom olefins and saturated hydrocarbons that are found in a cracked hydrocarbon mixture is still more difficult, as they are more numerous and have the following boiling points:

| | Boiling point, ° C. |
|---|---|
| Isobutane | $-11.7$ |
| Isobutene | $-6.9$ |
| 1-butene | $-6.3$ |
| Butadiene | $-4.4$ |
| n-butane | $-0.5$ |
| 2-butene, trans | $-0.9$ |
| 2-butene, cis | $+3.6$ |

The five-carbon-atom group of pentanes and pentenes is even more complex and the separation of all of these olefins from the associated saturated hydrocarbons by physical means has heretofore not been accomplished.

There are many chemical processes in which it is a decided advantage to use a substantially pure olefin, unmixed with inert diluents such as saturated hydrocarbons. For example, in chemical reactions with the gaseous olefins in which pressure is advantageous, the effective pressure is normally the partial pressure of the reactive olefin in the mixture. In such cases, substantially pure olefins permit much lower pressures to be employed and less gas to be compressed than in the case of gas mixtures poor in reactive olefin. Also, in many cases the olefin reaction may be reversible, the proportion of the desired product being dependent upon the concentration of the reactive olefin in the mixture. In such cases, the dilution of the olefin with an inert diluent, such as a saturated hydrocarbon, may so affect the yield of the desired reaction product as to render the process unprofitable.

Pure olefinic hydrocarbons have been separated from naphthas containing the olefins diluted with paraffinic hydrocarbons of approximately the same boiling point by treating the naphtha with sulfuric acid under such conditions of acid strength, temperature, etc., as to selectively extract the olefins into the acid phase. The separated acid extract containing olefins may then be subjected to conditions whereby the olefin is recovered and the acid returned to the extraction step. This has been done heretofore by steam stripping preceded when required by suitable dilution with water. The disadvantages encountered were that more heat was required to strip the diluted acid extract and substantial amounts of alcohol were distilled over.

It is well known that sulfuric acid may readily polymerize the olefins and it is well known that, when the olefin-sulfuric acid reaction products are heated for any considerable time without sufficient dilution, polymerization and secondary oxidation reactions such as the formation of tar or carbon occur with decomposition of the sulfuric acid to sulfur dioxide and water. It is also known that under these conditions an excess of uncombined sulfuric acid increases the formation of polymers. Also, a disadvantage of extract dilution in the steam stripping process is the expense involved in handling, reconcentrating and reducing the carbon content of the hot dilute stripped acid.

Stripping the sulfuric acid extract containing olefin with other agents than steam was never heretofore successfully accomplished. Attempts to regenerate isobutylene extracts with low boiling hydrocarbon vapors failed. For example, a hydrocarbon fraction having four carbon atoms to the molecule was contacted with 65% sulfuric acid to obtain an extract containing essentially pure isobutylene. The 65% sulfuric acid extract contained 1.5 mols of isobutylene per mol of sulfuric acid. When treated countercurrently with seven volumes of vaporized naphtha having a boiling range of 160–175° F. only 41% of the isobutylene was regenerated, 22% appearing as polymer either in the stripped isobutylene or as an insoluble phase floating on the spent acid. The balance of the isobutylene remained dissolved in the spent acid.

According to this invention, it was found that tertiary olefins may be stripped at essentially atmospheric pressure from a sulfuric acid solution with a vaporized narrow boiling hydrocarbon mixture, the components of which are substantially non-reactive with the sulfuric acid and have a boiling range preferably not greater than 30° to 40° F. and the lower boiling components boiling at about the same temperature or above that of the highest temperature used in the stripping column, the higher boiling components boiling below 350° F. and above 200° F. When regenerating with naphtha vapor of these boiling characteristics, considerable amounts of naphtha are carried overhead with the regenerated isobutylene. In addition the isobutylene is contaminated with alcohol which has been formed by hydration of the olefin in the sulfuric acid and stripped out of the acid by the naphtha. This naphtha and alcohol along with any water carried overhead is removed from the isobutylene by distillation and recycled to the regenerator, preferably being introduced at the top. The alcohol is dehydrated in the regenerator and finally recovered as regenerated isobutylene or polymer. The naphtha, along with any naphtha condensed in the regenerator, passes out the bottom of the regeneration tower with the spent acid in which it is insoluble and from which it is separated by decantation. The naphtha condensed within the regenerator releases its heat of condensation which effects the regeneration of the isobutylene. The spent acid and naphtha are then recycled. If desired, the naphtha may be caustic, scrubbed or treated in any other appropriate manner to remove any corrosive acidic constituents before revaporization. Also a portion of the spent acid may be treated to reduce its carbon content or to adjust its acidity by dilution or concentration as may be desired. For example, when an acid extract containing 1.5 mols of isobutylene per mol of sulfuric acid was treated countercurrently with 7.7 volumes of vaporized naphtha, having a boiling range of 222°–237° F., 91% of the isobutylene was regenerated. In this case 0.7 volume of naphtha passed overhead with the isobutylene and 7.0 condensed in the regenerator and was withdrawn with the spent acid from which it was separated by decantation. The naphtha taken overhead contains about an equal volume of polymer and alcohol. In addition to the increased recovery of isobutylene the amount of alcohol and naphtha vapor which had to be separated from the isobutylene and recycled to the regeneration step decreased from 8.6, obtained when using an equal volume of the 160°–175° F. naphtha, to 1.5 volumes of liquid recycle per volume of extract feed. It was also found that by increasing the boiling point of the stripping naphtha to from 252° F. to 257° F., that it was possible to reduce the quantity of recycle alcohol and naphtha from 1.5 to 1.0 volumes of recycle per volume of extract feed, while the recovery of isobutylene was still maintained at 90% of the isobutylene originally in the extract.

The concentration of the sulfuric acid used for extracting tertiary olefins containing four-carbon-atoms to the molecule ranges from 55% to 70% $H_2SO_4$. The naphtha used for regeneration consists of saturated hydrocarbons obtained by petroleum distillation. Polymers of isobutylene boiling above 200° F. may be used for stripping the sulfuric acid extract; naphthenes, aromatics and olefins may likewise be used. Atmospheric pressure as well as higher and lower pressure may be used.

The following table illustrates the boiling ranges of the stripping agents and temperatures used in recovering isobutylene.

TABLE—RECOVERY OF ISOBUTYLENE FROM ACID EXTRACTS
*Use of an inert stripping agent for regeneration of isobutylene from acid extracts*

| Run Number | 1 | 2 | 3 | 4 | 5 | 6 | 7 | 8 | 9 | 10 | 11 | 12 |
|---|---|---|---|---|---|---|---|---|---|---|---|---|
| Operating Variables: | | | | | | | | | | | | |
| Naphtha Stripping Agent— | | | | | | | | | | | | |
| Cut Points, ° F. | 160/175 | 175/197 | 216/222 | | 222/237 | | | 252/257 | | | 257/266 | |
| Feed Rate, Vols./Vol. Extract | 7.2 | 7.9 | 5.7 | 7.6 | 3.6 | 7.7 | 11.5 | 3.7 | 5.9 | 7.4 | 3.9 | 8.6 |
| Temperatures, ° F.: | | | | | | | | | | | | |
| Desorber— | | | | | | | | | | | | |
| Top | 95 | 102 | 155 | 159 | 150 | 165 | 166 | 140 | 142 | 147 | 115 | 162 |
| Bottom | 153 | 177 | 219 | 220 | 227 | 226 | 230 | 240 | 250 | 250 | 252 | 255 |
| Naphtha Inlet | 250 | 248 | 255 | 265 | 317 | 296 | 288 | 295 | 305 | 285 | 342 | 328 |
| Olefin Recovery, Wt. per cent: | | | | | | | | | | | | |
| As gas | 41 | 64 | 81 | 83 | 86 | 90 | 90 | 78 | 90 | 89 | 80 | 87 |
| As polymer | 22 | 30 | 14 | 13 | 9 | 7 | 5 | 17 | 9 | 11 | 18 | 13 |
| As carbon in spent acid | | 2 | 1 | 2 | 2 | 2 | 1 | 1 | 1 | 1 | 1 | 1 |
| Total Recovery | | 96 | 96 | 98 | 97 | 99 | 96 | 96 | 100 | 101 | 99 | 101 |
| Isobutylene Recovery, per cent | | 64 | 83 | 85 | 88 | 91 | 90 | 80 | 91 | 90 | 82 | 88 |
| Stripping Agent Distribution: | | | | | | | | | | | | |
| Recycle Stream— | | | | | | | | | | | | |
| Vol. per cent of Extract Fed | 860 | 640 | 105 | 230 | 90 | 150 | 330 | 0 | 50 | 100 | 19 | 160 |
| Vol. per cent Naphtha | 52 | 61 | 54 | 49 | 46 | 54 | 58 | | 55 | 44 | 41 | 45 |
| Spent Naphtha— | | | | | | | | | | | | |
| Vol. per cent of Extract (Separated from Spent Acid) | 730 | 800 | 570 | 770 | 370 | 780 | 1,160 | 380 | 600 | 730 | 400 | 860 |

If desired, polymers of the olefin being regenerated can be used as the stripping agent. For example, isobutylene is known to polymerize within itself to give a dimer boiling between 212 and 221° F.; and with n-butylene to give a codimer boiling between 221 and 257° F.; and is also known to polymerize with n-butylene or itself to give trimers boiling between 338 and 374° F. Any of these and other reaction products may be used as stripping agents in the present invention.

What is claimed is:

1. A process for separating a tertiary olefin from a mixture of saturated and unsaturated hydrocarbons which comprises contacting a mixture of saturated and unsaturated hydrocarbons containing a tertiary olefin with a sulfuric acid of sufficient concentration to extract the tertiary olefin without polymerization and forming an acid extract, separating the acid extract from the unabsorbed hydrocarbons, contacting the acid extract with vapors of saturated hydrocarbons boiling within the range of 222° F. to 257° F., separating the said mixture of hydrocarbons from the sulfuric acid and distilling off the tertiary olefin.

2. A process for separating a tertiary olefin from a mixture of saturated and unsaturated hydrocarbons which comprises contacting a mixture of saturated and unsaturated hydrocarbons containing a tertiary olefin with a sulfuric acid of 55% to 70% concentration and forming an acid extract, separating the acid extract from the unabsorbed hydrocarbons, contacting the acid extract with vapors of saturated hydrocarbons boiling within the range of 222° F. to 257° F., separating the said mixture of hydrocarbons from the sulfuric acid and distilling off the tertiary olefin.

3. A process for separating isobutylene from a mixture of saturated and unsaturated hydrocarbons which comprises contacting a mixture of saturated and unsaturated hydrocarbons having four carbon atoms to the molecule and containing isobutylene with a sulfuric acid of 55% to 70% concentration to form an acid extract, separating the acid extract from the unabsorbed hydrocarbons, contacting the acid extract with vapors of saturated hydrocarbons boiling within the range of 222° F. to 257° F., separating the said mixture of hydrocarbons from the sulfuric acid and distilling off the isobutylene.

4. A process for separating isobutylene from a mixture of saturated and unsaturated hydrocarbons which comprises contacting a mixture of saturated and unsaturated hydrocarbons having four carbon atoms to the molecule and containing isobutylene with a sulfuric acid of 55% to 70% concentration to form an acid extract, separating the acid extract from the unabsorbed hydrocarbons, contacting the acid extract with vapors of saturated hydrocarbons boiling within the range of 222° F. to 237° F., separating the said mixture of hydrocarbons from the sulfuric acid and distilling off the isobutylene.

5. A process for separating isobutylene from a mixture of saturated and unsaturated hydrocarbons which comprises contacting a mixture of saturated and unsaturated hydrocarbons having four carbon atoms to the molecule and containing isobutylene with a sulfuric acid of 55% to 70% concentration to form an acid extract, separating the acid extract from the unabsorbed hydrocarbons, contacting the acid extract with vapors of saturated hydrocarbons boiling within the range of 237° F. to 257° F., separating the said mixture of hydrocarbons from the sulfuric acid and distilling off the isobutylene.

6. A process for separating isobutylene from a mixture of saturated and unsaturated hydrocarbons which comprises contacting a mixture of saturated and unsaturated hydrocarbons having four carbon atoms to the molecule and containing isobutylene with a sulfuric acid of 55% to 75% concentration to form an acid extract, separating the acid extract from unabsorbed hydrocarbons, contacting the acid extract with a mixture of saturated hydrocarbons boiling above 257° F. and below 350° F. and having a boiling range spread of not more than 30° F. to 40° F., separating the said mixture of hydrocarbons from a sulfuric acid and distilling off the isobutylene.

7. A process for separating isobutylene from a mixture of saturated and unsaturated hydrocarbons which comprises contacting a mixture of saturated and unsaturated hydrocarbons having four carbon atoms to the molecule and containing isobutylene with a sulfuric acid of 55% to 70% concentration to form an acid extract, separating the acid extract from the unabsorbed hydrocarbons, contacting the acid extract with vapors of a polymer of isobutylene boiling above 200° F., separating the said mixture of hydrocarbons from the sulfuric acid and distilling off the isobutylene.

8. A process for separating isobutylene from a mixture of saturated and unsaturated hydrocarbons which comprises contacting a mixture of saturated and unsaturated hydrocarbons having four carbon atoms to the molecule and containing isobutylene with sulfuric acid of 55% to 70% concentration to form an acid extract, separating the acid extract from the unabsorbed hydrocarbons, contacting the acid extract with vapors of saturated hydrocarbons in a regeneration tower where a bottom tower temperature of between 225° and 250° F. and a top tower temperature of between 145° and 180° F. is maintained, separating an overhead fraction of hydrocarbons, and separating isobutylene from the said fraction by distillation.

9. A process of separating isobutylene from a mixture of saturated and unsaturated hydrocarbons according to claim 8, in which polymers of isobutylene boiling above 200° F. may be used for stripping the sulfuric acid extract.

10. A process for separating a tertiary olefin from a mixture of saturated and unsaturated hydrocarbons which comprises contacting a mixture of saturated and unsaturated hydrocarbons containing a tertiary olefin with sulfuric acid of sufficient concentration to extract the tertiary olefin without polymerization and to form an acid extract, separating the acid extract from the unabsorbed hydrocarbons, contacting the acid extract with the vapors of hydrocarbons boiling above 200° F. and below 375° F. separating the said mixture of hydrocarbons from the sulfuric acid and distilling off the tertiary olefin.

HENRY J. HIBSHMAN.

REFERENCES CITED

The following references are of record in the file of this patent:

UNITED STATES PATENTS

| Number | Name | Date |
|---|---|---|
| 2,380,350 | Willauer et al. | July 10, 1945 |